April 7, 1970     D. R. REARDON     3,504,515
PIPE SWEDGING TOOL
Filed Sept. 25, 1967     3 Sheets-Sheet 1
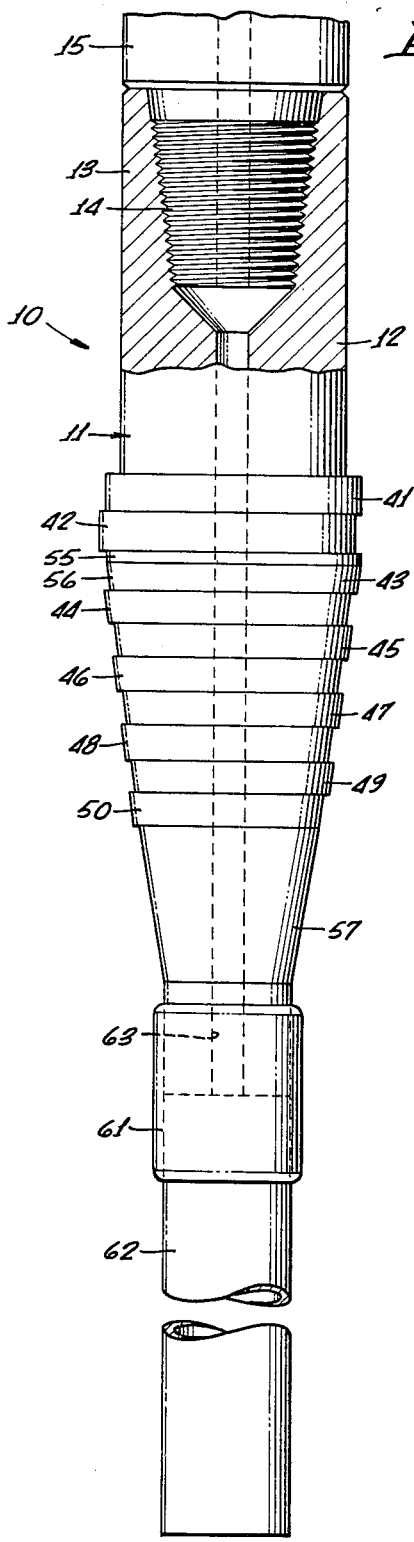
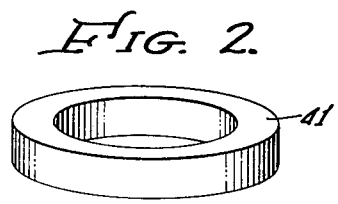
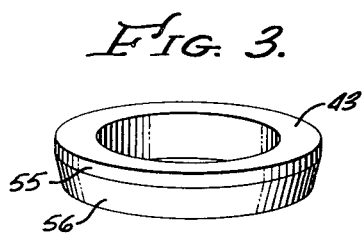
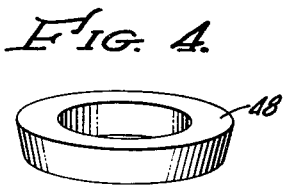
INVENTOR.
DANIEL R. REARDON
ATTORNEY.

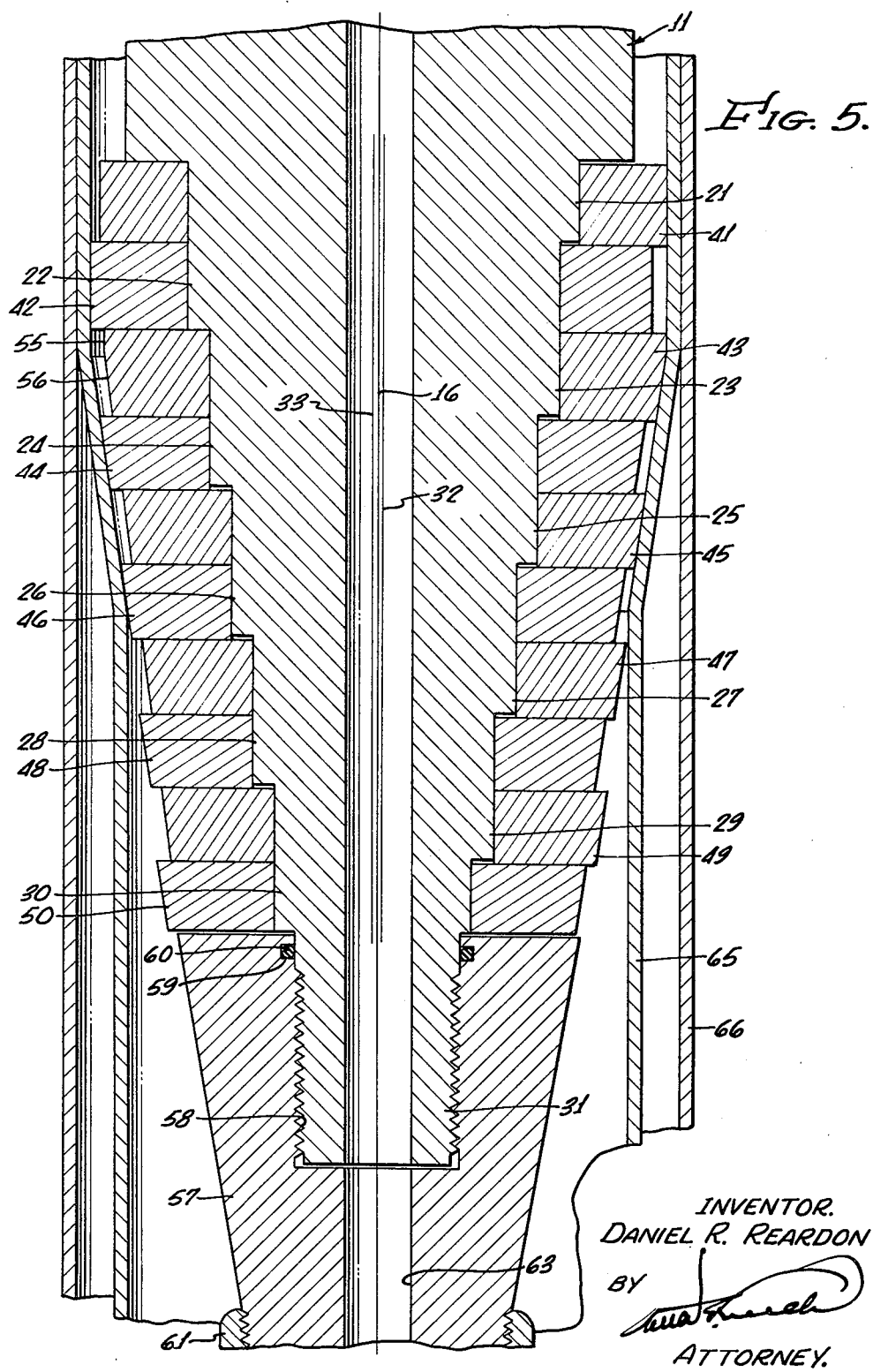

April 7, 1970
D. R. REARDON
3,504,515
PIPE SWEDGING TOOL
Filed Sept. 25, 1967
3 Sheets-Sheet 3
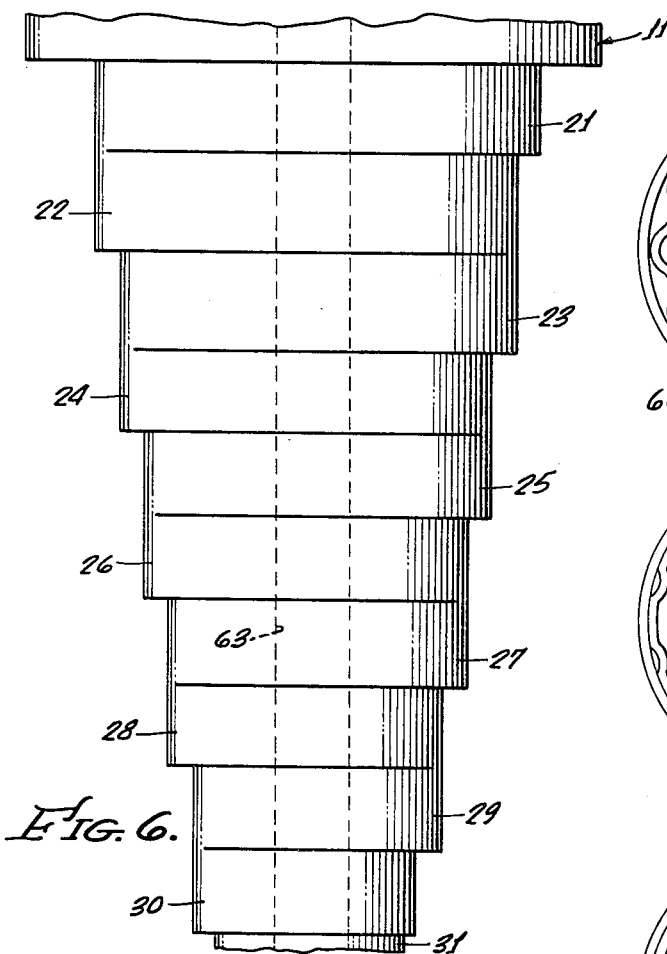
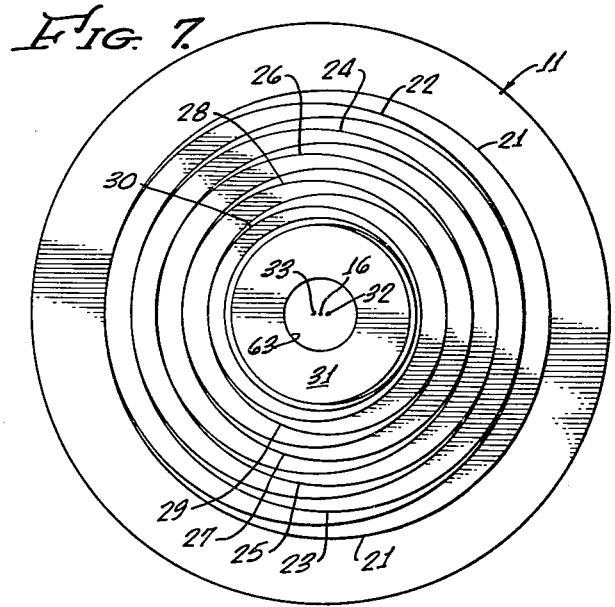
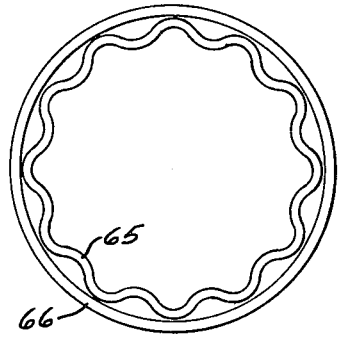
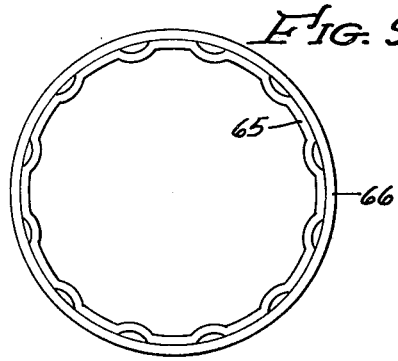
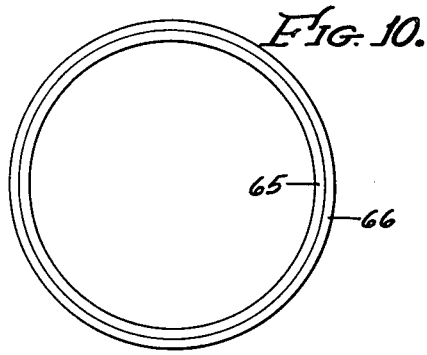
INVENTOR.
DANIEL R. REARDON
BY
ATTORNEY.

United States Patent Office 3,504,515
Patented Apr. 7, 1970

3,504,515
PIPE SWEDGING TOOL
Daniel R Reardon, Garden Grove, Calif.
(P.O. Box 6127, Long Beach, Calif. 91706)
Filed Sept. 25, 1967, Ser. No. 670,107
Int. Cl. B21d 3/02; E21b 29/00
U.S. Cl. 72—126                                             3 Claims

ABSTRACT OF THE DISCLOSURE

A mandrel providing an integral series of short alternately oppositely eccentric roller pins which progressively decrease in diameter and roller rings journalling respectively on said pins and with progressively decreasing outside diameters.

BACKGROUND OF THE INVENTION

Field of the invention

While useful in many fields the present invention was initially developed for swedging a longitudinally corrugated tubular insert into snug internal conformity with a damaged well casing so as to repair the latter.

Description of the prior art

Heretofore, the best swedging tool available for accomplishing the repair of a well casing in the manner above noted constituted a mandrel having a number of relatively small diameter rollers rotatably supported thereon on pins of rather small diameter and mounted in recesses formed in the peripheral surface of the mandrel. The small diameters of the rollers and pins used in this type of prior art equipment was the cause of quite a number of failures in the use of this equipment, the very large strains imposed thereon causing the breaking of the pins on which the rollers were mounted.

SUMMARY OF THE INVENTION

It is an object of the present invention to provide a pipe swedging tool which will perform the aforementioned casing repair job without damage to the tool and with a high degree of efficiency and precision in the final result.

To accomplish this object the tool of the present invention aims to utilize rollers of as large a diameter as possible at the entering end of the tool and give these rollers relatively short length axially and place them in direct end-to-end contact and mount said rollers on an integral series of short alternately oppositely eccentric pins which have a relatively large outside diameter and therefore permit the application of extremely high swedging pressures by said rollers when the tool is introduced into a pipe to expand the same to uniformly increase its inside diameter and roll this into true cylindrical shape.

Due to the relatively large diameter of the pins of the mandrel of the tool of the invention and the corresponding large inside diameter of the axially short rollers mounted respectively on said pins, and the necessary taper of the general outside diameter of the tool required for its operation in expanding a tube, the difference between the inside and the outside diameters of each of said rollers is relatively small so that due to the short axial length of the roller, the latter may almost better be described as a ring although it functions as a roller.

Furthermore, the requirement that the tool taper requires a reduction in outside diameter of successive rollers and it has been found that this end may be achieved by making the difference between the inside and outside diameters of all the rollers approximately a constant value.

It has furthermore been found to contribute to the smooth operation of the tool to have the external surfaces of each of the rollers tapered toward the smaller end of the tool in approximate conformity with the overall taper of the tool.

In the tool of the invention the aforementioned series of roller rings terminates, at the larger end of the series, in three gauge rollers, the peripheral surfaces of at least the final two of which are cylindrical. These gauge rollers apply the final swedging action of the tool to the interior of the tube being expanded so as to produce a smooth cylindrical surface within said tube which has precisely the desired inside diameter.

BRIEF DESCRIPTION OF THE DRAWINGS

FIGURE 1 is an elevational view of a preferred embodiment of the invention, partially broken away to illustrate the tool joint box provided in the upper sub thereof.

FIGURE 2 is a perspective view of the upper cylindrical gauge roller ring of the invention.

FIGURE 3 is a perspective view of the partially cylindrical and partially tapered lower gauge roller ring of the invention.

FIGURE 4 is a perspective view of one of the fully tapered roller rings of the invention.

FIGURE 5 is an enlarged fragmentary vertical sectional view of the invention which illustrates the operation of this in swedging a longitudinally corrugated tube or pipe into cylindrical form with said pipe expanded into tight internal conformity with a casing which is thereby lined internally for the purpose of effecting a repair of said casing.

FIGURE 6 is a fragmentary side elevational view of the mandrel of the invention showing the integral series of short alternately oppositely eccentric roller pins which progressively decrease in diameter and are embodied integrally with the mandrel of the invention.

FIGURE 7 is an end view of the mandrel of the invention which discloses the outlines of said integral series of short roller pins and how each cylindrical surface of each pin is tangent on opposite sides of the axis of the mandrel with the roller pins disposed immediately above and immediately therebelow.

FIGURE 8 is a diagrammatic cross-sectional view of a cylindrical well casing into which a longitudinally corrugated pipe has been inserted as the first step in effecting a repair of said well casing by swedging said pipe into intimate cylindrical internal contact with said casing.

FIGURE 9 is a view similar to FIGURE 8 and showing said well casing and said corrugated pipe after the latter has been partially expanded into internal contact with said casing as by the application of a packer thereto or through the application of hydraulic pressure.

FIGURE 10 is a view similar to FIGURE 9 but illustrating the final result of swedging said pipe with the present invention to expand the same into true cylindrical form and with said pipe conforming intimately to the internal surface of said casing and thereby lining the latter.

DESCRIPTION OF THE PREFERRED EMBODIMENT

Referring specifically to the drawings, the invention is there shown as embodied in a pipe swedging tool 10 having a mandrel 11 comprising a heavy upper sub 12 which is provided with a conventional internally threaded tool joint box 13 into which the threaded pin 14 provided at the lower end of a drill string 15 is screwed so as to mount said tool on the lower end of said drill string.

The upper sub 12 is concentric with the longitudinal axis 16 of said tool. An integral series of axially short roller pins identified individually by numerals 21 to 30 inclusive are formed by machining the body of the mandrel 11 so that these pins occupy the space between the upper sub 12 and a threaded pin 31 which is concentric with the axis 16 of said mandrel.

The odd numbered roller pins are formed concentrically with eccentric axis 32 and the even numbered roller pins are formed concentrically with eccentric axis 33. Each of the roller pins 21–30 is formed with a radius about its eccentric axis so that in the plane in which the section of the tool is shown in FIGURE 1, the outer surface of that roller pin is tangent with the surface of the roller pin directly thereabove and, at a diametrically opposite point in said plane, the outer surface of said roller pin is tangent with the outer surface of the roller pin disposed immediately therebelow. This statement is true of roller pins 21 and 30 with the exception that there is no roller pin above roller pin 21 and there is no roller pin below roller pin 30.

Mounted respectively on roller pins 21–30 are roller rings 41–50. Rings 41 and 42 have cylindrical outer surfaces. The outer surface of ring 43 has an upper cylindrical band 55 and a lower tapered band 56. The peripheral surfaces of rollers 44–50 inclusive are uniformly tapered to conform approximately to the general taper of the tool 10. It is to be further noted that at the end of maximum diameter of each of the roller rings 41–50, the difference between the inside diameter and outside diameter of that roller ring is approximately the same as the difference in outside and inside diameters at the same place of each of the other roller rings.

The tool 10 is also provided with a tapered lower sub 57 which is provided with a tapped bore 58 which screws onto the threaded pin 31, this bore being provided near its upper end with an annular recess 59 for receiving an O-ring 60.

The lower end of lower sub 57 is externally threaded to unite with a collar 61 from which a wash pipe 62 may be suspended. The tool 10 is provided with an axial passage 63 for transmitting circulating fluid from the drill string 15 downwardly to the wash pipe 62 for lubricating the tool 10 during is operation.

Referring now to FIGURES 1 and 5 to 10 inclusive, a typical swedging operation employing the tool 10 of the invention starts with the insertion of a longitudinally corrugated pipe 65 downwardly into a section of casing 66 which, because of damage thereto, needs to be lined. The pipe 65 is carefully dimensioned so that when it is fully expanded into a cylindrical tubular condition inside the casing 66 it will be compressed tightly into intimate contact with the inner surfaces of said casing so as to prevent the passage of fluid therebetween.

The first step employed in expanding the pipe 65 from the condition in which it is shown in FIGURE 8 to the condition in which it is shown in FIGURE 9 is generally accomplished by expanding a packer inside said pipe or confining a body of liquid therein under high pressure so as to produce an approximate expansion of said pipe into contact with the casing 66 as shown in FIGURE 9. The completion of the job requires a swedging operation and it is for this that the tool 10 is provided. For use in this particular situation, the tool 10 must be prepared, in the assembly of this, with the roller rings 41, 42 and 43 being selected so that when the tool 10 is lowered on the lower end of the drill string into contact with the upper end of the corrugated pipe 65 and rotated, the swedging action of the tool 10 will just expand the pipe 65 into cylindrical form and in intimate contact with the inner surface of the casing 66 as shown in FIGURE 10 when the gauging roller rings 41, 42 and 43 have produced a true cylindrical surface in the interior of the pipe 65.

Thus it would seem that the pipe swedging tool 10 is adapted to perform swedging operations which conclude with the development of an internal cylindrical surface in the pipe being swedged which varies in accordance with the outside diameters of the gauge roller rings 41, 42 and 43 of the invention. Each tool 10 therefore is provided with several sets of these gauge roller rings, the outside diameter of the gauge rings in each set varying from the outside diameters of those in the other sets so that the tool 10 can be readily disassembled and reassembled by unscrewing the lower sub 57 from the pin 31 of the mandrel, removing all the roller rings 41–50, then reassemblying the tool 10 with the particular group of gauge rings 41, 42 and 43 which are required for the swedging job immediately in prospect.

Although the pins 21–30 are shown herein as alternately concentric with two eccentric axes 32 and 33 spaced apart 180°, so that five of the rollers 41–50 are in diametral opposition to the other five rollers, it is within the teaching of the present invention to form the pins 21–30 concentric with three or more eccentric axes equally spaced short distances from the mandrel axis 16 and symmetrically arranged circumferentially about axis 16. If there were three eccentric axes they would be spaced apart by angles of 120° and if there were four, they would be spaced apart 90°.

The larger the number of eccentric axes in the tool 10, the less tendency there is for the tool to impart an elliptical cross section to the pipe being swedged.

While the present invention is disclosed herein as used in the lining of well casing, it has wide applicability in any swedging operation involving expansion of a tube or pipe so as to produce therein a smooth internal cylindrical surface with a precise diameter.

I claim:
1. In a pipe expanding swedging tool, the combination of:
   a mandrel having a longitudinal central rotational axis and having formed integral therewith, in end to end relationship, a longitudinally arranged series of short roller pins which are approximately uniform in length and progressively decrease in outside diameter, the latter varying approximately between five times and two times said pin length said pins having axes which are eccentric with and spaced short distances from said mandrel axis and are distributed symmetrically about the latter, each pin being integral throughout approximately its entire transverse cross sectional area either with said mandrel or with the immediately adjacent pin next larger in diameter;
   a series of roller rings journalling respectively on said pins and corresponding thereto in axial length and having progressively decreasing outside diameters, a substantial group of the smaller of said rings having their peripheries taper consistently with the general taper of the tool; and
   means for retaining said roller rings on said pins.

2. A pipe swedging tool as recited in claim 1 wherein the final three roller rings of said series are provided with cylindrical external faces whereby said three roller rings, having the final contact with the internal surface of a pipe being expanded by said tool, will cooperate in imparting an approximately cylindrical surface to the interior of said pipe.

3. A pipe swedging tool as recited in any of claim 1 wherein
   the difference between the inside diameter and the maximum outside diameter in all of said roller rings is approximately a constant.

References Cited
UNITED STATES PATENTS

| 1,641,519 | 9/1927 | Andre | 72—126 |
| 2,690,783 | 10/1954 | Colmerauer | 72—126 |

LOWELL A. LARSON, Primary Examiner

U.S. Cl. X.R.

72—479